July 7, 1936.  E. L. TORNQUIST  2,046,591
FLUID METER
Filed Feb. 13, 1930   2 Sheets-Sheet 1
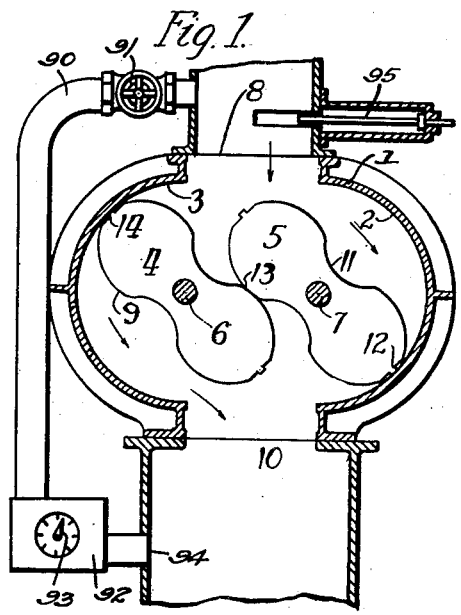
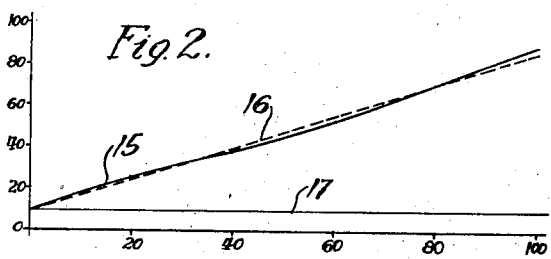
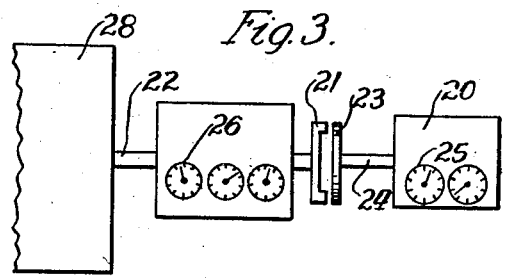
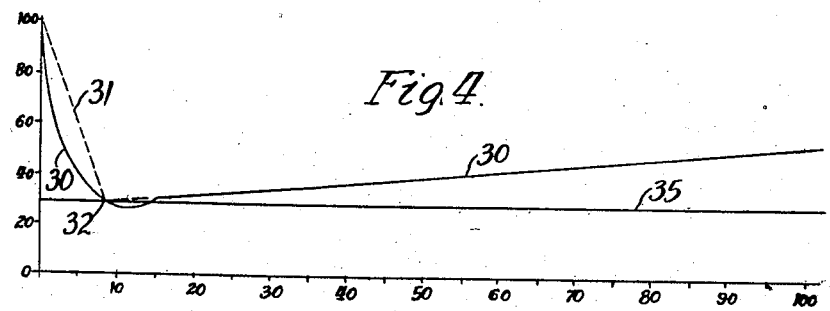
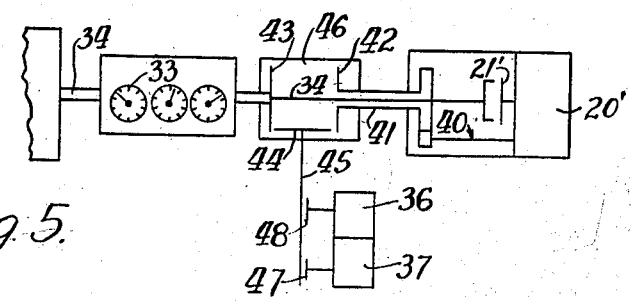
Inventor
Earl L. Tornquist
By *[signature]*
Att'ys July 7, 1936.  E. L. TORNQUIST  2,046,591
FLUID METER
Filed Feb. 13, 1930  2 Sheets-Sheet 2
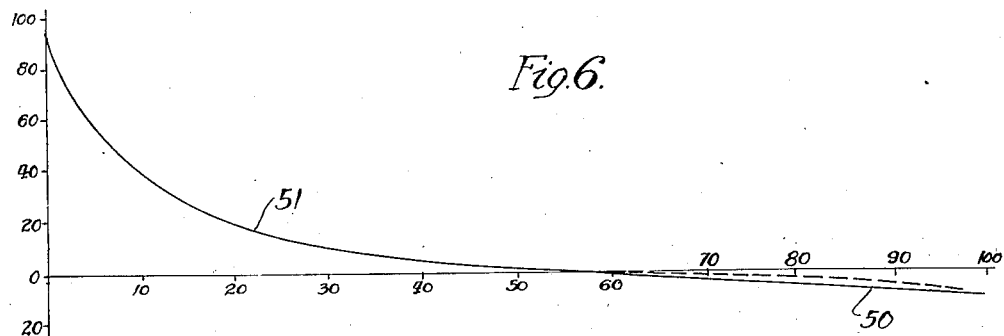
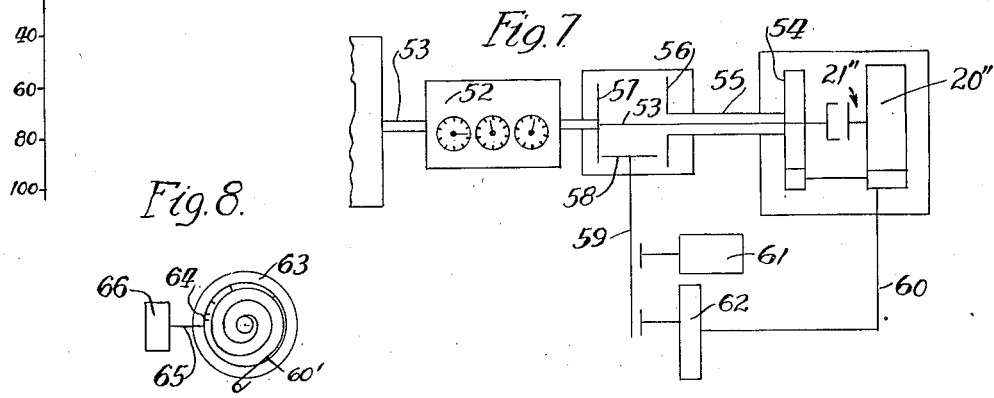
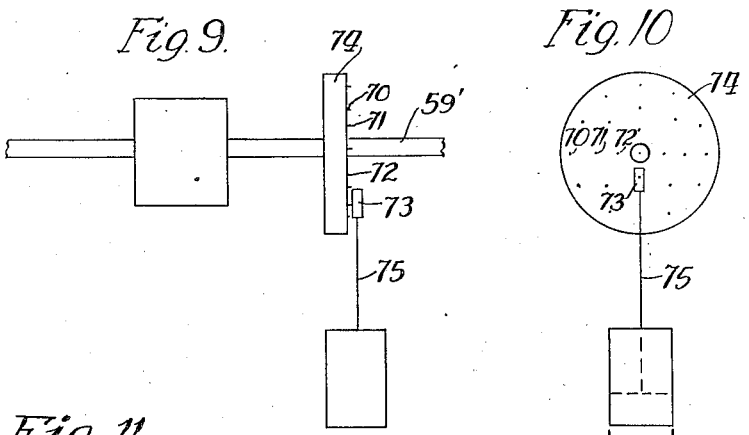
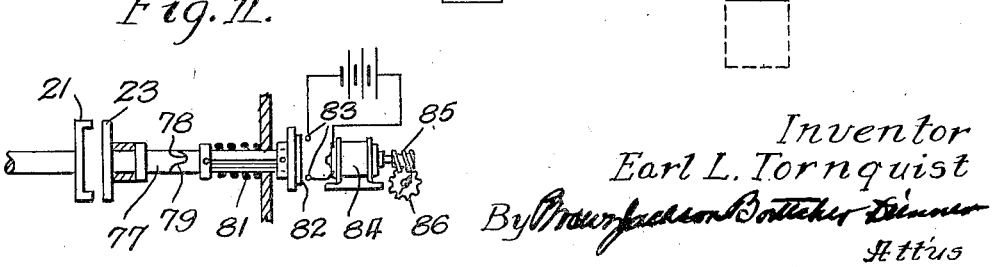
Inventor
Earl L. Tornquist Patented July 7, 1936

2,046,591

UNITED STATES PATENT OFFICE 2,046,591

FLUID METER

Earl L. Tornquist, Oak Park, Ill.

Application February 13, 1930, Serial No. 428,092

12 Claims. (Cl. 73—233)

This invention relates in general to meters, more particularly to meters of the rotary displacement type, and has for its principal object the provision of a new and improved means for registering and compensating for the slippage of such meters.

Rotary displacement meters are frequently used to measure large quantities of gas, air, or liquid, because meters of this type when built to handle large capacities of the medium that they are to measure require less floor space than do the absolute displacement type meters. This saving in floor space renders the rotary displacement type meter advantageous in many instances.

The rotary displacement type meter usually comprises a pair of vanes or impellers formed as mathematical curves, these curves generally being either cycloidal or involute curves. The movement of gas or other medium through the meter revolves these impellers, which are mounted upon suitable shafts that are spaced apart sufficiently to permit the two impellers to revolve in opposite directions within the meter. The edge of one of the impellers practically touches the edge of the other impeller while the two are being revolved so that leakage between the two impellers is reduced to a minimum.

In spite of this careful design of the shape of the impellers and the carefulness employed in fitting the impellers into the chamber in which they are to revolve, there is an appreciable amount of leakage past the impellers, particularly so if the medium being measured is a gaseous medium such as illuminating gas or air.

In certain instances in a meter of large capacity, say for example 200,000 cubic feet per hour, the leakage through the meter is sufficient to permit operating a considerable number of gas fired devices without causing the meter to revolve at all.

In an installation of this kind in which the normal consumption of gas is high, when the industrial plant shuts down as it will overnight or over a weekend, the consumption of gas drops to such a figure that the meter is not operated and the gas company therefore does not receive any pay for the gas that it is supplying.

This condition has been recognized heretofore and various devices of which I am aware have been provided to disconnect the rotary displacement type meter from the load when the demand falls below a certain point, usually a point just about where the rotary displacement meter will stop, and substitute for that meter an absolute displacement meter of smaller capacity which is operated to measure the gas consumed when the demand is exceptionally low.

This enables the gas company to receive pay for the gas that it is supplying at low demand, and insofar as the arrangement goes is satisfactory. In my present invention I do not alter this arrangement, that is I contemplate supplying the usual valve which may be either automatically or manually operated to remove the rotary displacement meter from service and substitute an absolute displacement meter when the demand is sufficiently low to warrant it.

Rotary displacement meters have a certain amount of slippage in addition to that which permits gas to leak through the meter without operating it. When the meter is operating at any rate of demand, there is a certain amount of gas that leaks through between the ends of the impellers and the walls of the chamber, around the ends of the impellers, and between the two blades. This leakage is an appreciable amount in all meters, and in some meters may reach as high as 10% of the demand through the meter particularly if the meter is in poor repair. The gas that leaks past the impellers because of this slippage is supplied to the customer by the gas company without that company being able to assess a charge for it.

The object of the present invention is to provide a means for measuring the gas that leaks through the meter because of meter slippage, registering that amount, so that the gas company may receive a fair compensation for the gas furnished.

The slippage characteristic of rotary displacement meters varies with the particular meter. In certain instances the slippage is a direct function of the demand through the meter, that is, a curve plotted with demand through the meter as abscissæ and slippage as ordinate results in a straight line, or a practically straight line sloping upward as the demand increases.

In certain other meters, the slippage is exceedingly high at extremely low speeds of the meter, falling off to a low point and then again rising as the demand through the meter increases. In certain instances a slippage characteristic curve of a meter of this type likewise plotted with the demand through the meter as abscissæ and the slippage as ordinate will show two curves which are practically straight lines, these curves intersecting at the point of low slippage of the meter.

In certain other meters, the slippage demand characteristic of the meter comprises a portion which is a straight line and a portion which is the curve of a complex function of the speed of the meter, the curve being so acute that a very appreciable error would be introduced into the registering if the curve were assumed to be a straight line.

In my present invention I have provided an arrangement which permits registering the slippage of meters having any one of the three foregoing types of slippage characteristics, the registering being done with simple means which register the slippage with a very small percentage error.

Further objects of my invention will be better understood from a reading of the detailed description and claims which follow, reference being had to the accompanying drawings which diagrammatically illustrate the invention and in which:

Figure 1 is a diagrammatic cross-sectional view of a meter of the rotary displacement type to which the invention relates, Figure 2 is a demand slippage characteristic curve of a certain meter of this type, Figure 3 is a diagrammatic representation of the compensating device attached to the meter to register its slippage, Figure 4 is a demand slippage characteristic curve of another meter of this type, Figure 5 is a diagrammatic representation of a compensating device attached to the meter shown in Figure 4 to register the slippage of a meter of that characteristic, Figure 6 is a demand slippage characteristic of another meter, Figure 7 is a diagrammatic representation of a registering device for registering the slippage of a meter having a slippage of the type shown in Figure 6, Figure 8 is a diagrammatic representation of a part of the registering apparatus used in Figure 7, Figure 9 is a diagrammatic elevational view of the registering apparatus shown in Figure 8, Figure 10 is a diagrammatic plan view of a modified registering apparatus for use in Figure 7, and Fig. 11 is a diagrammatic view showing in detail the manner in which the meter may operate a switch for controlling certain registrations.

Referring to Figure 1 now in more detail, the meter comprises a casing 1 having semi-cylindrical inside surfaces 2 and 3 which partially define the chamber in which the involute solid impellers 4 and 5 are mounted. These impellers are secured on shafts 6 and 7 and geared together by gears, not shown, so that when they are revolved by the movement of gas, air or a fluid through the meter, the impeller 5 revolves in a clockwise direction for example, and the impeller 4 in a counter-clockwise direction. The outside surfaces of the impellers 4 and 5 are accurately machined to conform to a mathematical curve, and the inside surfaces of 2 and 3 of the chamber are likewise accurately machined to register with the end of the impellers 4 and 5 as accurately as possible.

A by-pass conduit, indicated at 90, enters the gas conduit above the meter 1, and is provided with a valve 91, which may be either manually or automatically operated to open the conduit 90 when the demand through the meter 1 falls below that required to rotate the impellers. A second meter 92, of the absolute displacement type, is connected into the by-pass conduit, and has a register 93 which indicates the absolute fluid volume flowing through the by-pass. The conduit 90 enters the main gas conduit below the meter 1, as indicated at 94, and thus gas consumed under a demand less than that required to operate the meter 1 is accurately measured. A valve 95 is simultaneously adapted to be actuated to close off flow through the meter 1, since otherwise leakage through the meter 1 would allow the use of fluid not being metered. This is in accordance with known practice, and requires no further explanation.

Gas enters the meter through the opening 8 preferably located at the top, flowing in the direction of the arrows to the right against the upper surface of the impeller 5 causing that impeller to revolve in a clockwise direction. Gas which had previously been confined by the surface 9 of the impeller 4 is forced out of the lower port 10 of the meter chamber by the revolving of the impeller 4 in a counter-clockwise direction. The gas in this lower chamber is prevented from flowing between the impellers 4 and 5 by the squeezing action of the surfaces of the impellers as they come together during their revolution.

When the impeller blade 5 is in a vertical position, it closes off a chamber defined by the wall 2 of the meter chamber and the surface 11 of the impeller 5, trapping a definite amount of gas, that amount depending upon the cross-sectional area and length of the chamber in which it is confined.

It will be noted that the lower end of the impeller 5 touches the inner surface 2 of the wall of the chamber at the point 12, and since the impeller must revolve freely in the chamber this point of touching is very light with the result that it is possible for gas to leak through between the end of the impeller 5 and the surface 2 of the meter chamber. This opening through which the gas leaks is a rectangular slit or opening having a narrow width and a length equal to the length of the impeller chamber, that is the length of the impeller 5. A certain amount of gas may likewise leak between the impellers 4 and 5 at the point 13, and also between the impeller 4 and the surface 3 of the wall at the point 14. Gas may also leak between the ends of the impellers 4 and 5 and the end walls of the chamber 1, not shown. The shafts 6 and 7 are connected together through suitable gears and drive a register shaft which registers the revolutions of the meter to thereby register the volume of gas or other medium that is sent through the meter.

In certain meters, the slippage characteristic is a simple function of the demand of the meter, that is the speed at which the impellers 4 and 5 are revolving. In Figure 2 I have shown a curve of the slippage of a meter of this kind. In Figure 2 the abscissa represents the percentage of the load on the meter, the unit being percentage of full load of the meter and the ordinate represents percentage of slip of the meter. It will be seen that the slightly curved sloping line 15 rises from a point of approximately 10 percent slip at zero demand on the meter to approximately 100 percent slip at 100 percent demand, that is the slippage increases practically directly as the demand on the meter. It must be remembered that this 100 percent slip at 100 percent demand on the meter does not mean that all of the demand is slipping past the impeller blades of the meter but rather means that the slippage is maximum when the demand from the meter is maximum. The actual number of cubic feet slippage or leakage past the meter without being measured is a small percentage of the meter demand, usually from two percent in a very good meter to 10 percent in a very poor meter. By careful examination of the curve 15 it will be seen that if it is considered as a straight line indicated by the dotted line 16 only a very small error will be introduced in the calculation of the slip. For this reason the characteristic shown in Figure 2 may be considered as a straight line characteristic having a definite slope from zero demand on the meter to full load demand.

The data used in plotting the curve shown in Figure 2, and also that used to plot the curves shown in Figures 4 and 6 may be obtained by operating the meter at a certain demand, say 10%, under known conditions of gas temperature and pressure. The gas that passes through the meter is trapped in absolute displacement meters or measuring devices of known calibration and is accurately measured in these devices under the same temperature and pressure conditions. The dials of the meter are read and the amount of gas thereon registered compared with the amount measured in the absolute displacement device. This latter reading is higher by an amount equal to the slippage of the meter under test, and this amount is usually noted as a percentage of the demand of the meter under test. The tests are repeated for as many other demands through the meter as are necessary to determine the slippage characteristic of the meter and the data so obtained is plotted in the manner indicated in the above figures. Obviously if the slippage is practically a straight line function of the demand, fewer observations need to be taken than are necessary if it is a complex function of the slippage.

Preferably the meter register on the meter under test registers the theoretically correct displacement of the meter without overdrive, that is if the meter has a theoretical displacement of 10 cubic feet per revolution of the shaft, the registers are geared to register 10 cubic feet per revolution of the shaft. As will presently appear, these registers are frequently geared with an over drive so that the register registers over theoretical displacement, say 11 cubic feet per revolution for example. If the meter under test is equipped with this latter type of register, suitable corrections are noted in the slippage computations. Registers of this type are old and well understood by those skilled in the art, and I may make use of any one of several now commercially available, such as for example, the type shown in the Patent 996,471, issued to R. G. Dowins, June 27, 1911.

The compensation for slippage in a meter having the characteristic shown in Figure 2 is a relatively simple matter. In accordance with the teachings of my present invention, I divide this slippage into two parts, the first a constant slippage indicated by that area beneath the straight line 17 in Figure 2, that line being drawn through the intersection of the curve 15 and the ordinate. The gas represented by the area beneath the line 17 is a constant amount dependent only upon the length of time that the meter is in operation. To measure this amount, I simply have to provide a mechanism which will be driven at a constant speed as long as the meter is revolving, and a register driven by that mechanism to register a definite gas consumption per unit of time.

In Figure 3 I have diagrammatically illustrated a device of this kind indicated by the rectangle 20. This may be a clockwork mechanism having no spring and started by a suitable clutch arrangement such as the magnetic clutch 21 which is shown by way of example and is connected to the meter shaft 22 and revolves when that shaft is revolved. A disc 23 connected to the shaft 24 leading into the clockwork 20 is placed under torque by the magnetic attraction of the revolving permanent magnet 21 so that the clockwork 20 is started and runs as long as the magnet 21 is revolved to place the disc 23 under torque. Clockwork mechanisms of this type are commercially available and need not be explained more fully. Suitable registers indicated by the arrows 25 are driven by the constant speed mechanism 20 to indicate the length of time that the meter is operated, and these registers may be calibrated as a function of time and the unit leakage beneath the straight line 17 in the Figure 2.

While I have described the constant speed mechanism 20 as a clockwork it is not necessary to use a device of this kind, as a synchronous motor of the type shown in Patent 1,719,058 issued to W. Koenig July 2, 1929, and driven from a constant source of alternating current, might be substituted and started and stopped by a switch controlled by the turning of the shaft 24 responsive to the torque placed on that shaft by the rotating permanent magnet 21, or if desired any other preferred form of constant speed mechanism might be substituted for the clockwork described by way of example.

For example, in Figure 11 I have disclosed a switch operated by rotation of the meter shaft. In this figure, I have indicated the magnetic clutch 21, which drives, through disc 23, the shaft 77, which is suitably mounted for rotation, but is held against endwise movement. The shaft 77 has the cam surface 78, which engages cam surface 79 carried by shaft 80. The shaft 80 is preferably formed square, to prevent its rotation, but may be moved endwise against the pressure of spring 81.

The shaft 80 carries a contact block 82 at its free end, which engages switch contacts 83 for driving motor 84. The motor 84 may be any type of constant speed motor, and the shaft thereof carries a worm gear 85 meshing with the gear 86. The gear 86 may drive any suitable registering device. Thus, upon actuation of the disc 23 in response to rotation of clutch 21, the cam surface 77 engages the corresponding cam surface 78 and forces the contact block to close the circuit, driving the motor and thus driving the register. As long as the magnet 21 is rotating, the contact will be maintained, but when the meter ceases operation, the spring 81 will force the shaft 80 outwardly, and the circuit will be broken. The constant speed mechanism 20 may thus be driven only during rotation of the meter shaft.

To register the gas which slips through the meter at a rate proportional to the demand on the meter as indicated by the curve 15 or the straight line 16 which I propose to use in lieu thereof, I provide registers 26 which replace the usual register on the meter and are geared to an over-drive proportional to the slope of the straight line 16. As shown in Figure 2, the slope of this line 16 is approximately one in ten, so that it represents a slippage of approximately 10 percent which is considered by gearing in the register 26 so that it indicates an amount 10 percent higher than the revolution of the meter shaft 22 would indicate should be registered. When the amount of gas that has passed through the meter 28 is to be calculated, the reading of the register 26 is noted, and the reading of the register 25 noted and added to the value obtained from the register 26. The total amount of gas that has passed through the meter is thereby accurately determined and suitable charges can be assessed for it.

Other meters of this same type have a somewhat different characteristic slippage, a characteristic of this kind being shown in Figure 4. In this figure as in Figure 2, the abscissa is a percentage of the full load demand on the meter and the ordinate a percentage of the maximum slip. From this curve 30 it will be seen that at zero demand on the meter the slippage is 100 per cent and that this slippage falls rapidly until the demand on the meter is approximately 10 per cent of the full load demand. The curve 30 from 100 per cent at zero demand to approximately 30 per cent at 10 per cent demand is not a straight line but the error introduced by considering it a straight line is slight as will be seen by the dotted line 31. From the point 32 at which the curve 30 breaks and begins to rise again, the characteristic is practically a straight line up to 100 per cent demand on the meter, the slope of this line being somewhat less than that of the meter shown in Figure 2.

To register a slippage of this kind, I consider the slippage characteristic as consisting of two straight lines the one represented by the dotted line 31 from zero demand to the point of breakaway at approximately 10 per cent demand, and the second from this point 32 to the maximum demand on the meter.

The registers 33 of the meter are geared to the shaft 34 so that they read accurately at the point 32 of a slippage characteristic curve. The method of gearing a meter to read accurately at a particular point is well known to those skilled in the art and since my invention is not concerned with the particular manner of accomplishing this purpose, a detailed explanation of the arrangement is not deemed necessary herein.

With the register 33 so geared, the registrations obtained by it are a straight function of the demand on the meter correct to the demand at the point 32 and represented by the line 35 parallel to the abscissa. To register that portion of the slippage which occurs when the demand is greater than 10 per cent of full load demand, I provide an over-driven register which is revolved at a speed proportional to the speed of the meter shaft 34 in excess of its speed at 10 per cent demand on the meter. To register that portion of the slippage represented by the dotted line 31 I provide a second register which is driven at a speed proportional to the speed of the meter shaft 34 below the speed at which it is revolved at 10 per cent demand on the meter. The registers 36 and 37 are provided for these respective registrations, and the amount of over-drive of these registers is dependent upon the slope of the lines 30 and 31 which they are to indicate.

In order to accomplish this registration of speed of the meter shaft above or below the speed at 10 per cent demand, I provide a constant speed mechanism 20' which is preferably a springless clock mechanism driven by torque generated by the magnetic clutch arrangement 21' which is similar to that hereinbefore explained so th .t the mechanism 20' revolves or operates at a constant speed as long as the meter shaft 34 is revolving. In this case the constant speed mechanism 20' drives a gear 40 which is connected by the sleeve 41 to the differential gear 42. The sleeve 41 is employed so that the shaft 34 may be extended through it to support the magnet 21' which drives the constant speed mechanism 20'. The shaft 34 is provided with a differential gear 43 and the third differential gear 44 meshes with these two gears to control the shaft 45 from which the registers 36 and 37 are driven. The gear 42 and the gear 43 move in opposite directions and are timed so that when the meter is operating at 10 per cent full load, that is at the point 32 on the curve Figure 4, the gear 43 and the gear 42 are moving at the same speed but in the opposite directions. The gear 44 is therefore unable to move the shaft 45 and neither of the registers 36 nor 37 is operated since the register 33 is registering accurately at this point. It will be understood of course that the differential indicated generally at 46 is only diagrammatic and that the shaft is geared to a rotatable housing containing the gear 44 so that the shaft 45 is revolved proportionately to the revolution of that housing which is not shown.

If the demand through the meter falls to practically zero, the shaft 34 will be turning very slowly and the gear 43 likewise turning very slowly. The gear 42 revolves at a constant rate of speed and because of the differential effect on the gear 44 the shaft 45 will be revolved at a relatively high speed in such a direction as to operate the register 37 to register the slippage below the critical speed of the meter. The register 37 is over driven at a rate proportional to the slope of the dotted line 31 so that when the meter shaft is just barely moving a relatively high registration is obtained on the register 37.

When the meter shaft 34 is revolving faster than the gear 42 and the gear 43 is therefore moving faster than the gear 42, the gear 44 and the shaft 45 are operated in the opposite direction to drive the meter 36 which registers the slippage of the gas meter when that meter is operating on a demand in excess of the demand at the point 32 of the curve in Figure 4. The register 36 is geared into its drive shaft so that it overdrives at a rate proportional to the slope of the curve 30 to the right of the point 32 to thereby register a value equal to the slippage at the particular demand at which the meter is operating at the moment.

It will be understood that the registers 36 and 37 are geared to the shaft 45 so that the register 36 does not operate when the register 37 is operated and vice versa, the particular type of no back gearing employed for this purpose being well understood by those skilled in the art is shown only diagrammatically at 47 and 48, and need not be explained in detail here.

To compute the corrected amount of gas that has passed through the meter whose characteristic is shown in Figure 4, it is necessary to read the register 33, the register 36 and the register 37 and to add the amounts registered thereon together. If desired, the registers 33, 36, 37 may be replaced by a totalizing register of any of the well known types, the corrected amount of gas that has passed through the meter being read from that register.

Certain other rotary displacement type meters have a characteristic slippage which is considerably different from either of the foregoing. The slippage demand curve of such a meter is shown in Figure 6, with the percentage of the demand plotted as abscissæ and the percentage of the slippage as ordinates. It will be noted that the slippage of this particular meter is zero at 60 per cent demand, and that as the demand recedes from that point, the slippage increases slowly at first and rather rapidly from 20 per cent demand down to zero demand. It will also be noted that for meter demands above 60 per cent the slippage is negative, that is, it falls below the abscissa of demand.

The slippage above the 60 per cent demand falls practically upon a straight line 50, but the slippage below 60 per cent falls upon a complex curve 51 which is of sufficient variance from a straight line that the error introduced by considering it a straight line is rather more than a negligible amount.

To register the slippage of a meter of this type, I provide a register 52 which is geared to the meter shaft 53 to indicate properly at 60 per cent demand of the meter. The shaft 53 extends through the clutch 21" which operates the constant speed mechanism 20" in the hereinbefore explained manner. This constant speed mechanism drives a gear 54 which is connected through the sleeve 55 to the differential gear 56. A second differential gear 57 is connected to the meter shaft 53 and the third differential gear 58 to the register shaft 59.

The constant speed mechanism also drives and controls a registering device through the mechanism indicated diagrammatically at 60.

When the meter is operating at 60 per cent demand, the differential gear 56 and the differential gear 57 are revolving at the same speed but in opposite directions so that the shaft 59 which is operable through the gear 58 by a differential speed of gears 56 and 57, is not revolved and neither of the registers 61 or 62 is operated. The register 52 is then registering the gas consumption of the meter accurately.

When the demand through the meter is in excess of sixty percent of its full load, the meter shaft 53 revolves the gear 57 faster than the constant speed mechanism 20 rotates the differential gear 56, and the shaft 59 is revolved in one direction, by the differential action of the gears 56, 57 and 58, to drive the register 61 to register the slippage represented by the straight line 50. The register 61 is geared to the shaft 59 with an overdrive which causes it to register the slippage as a direct function of the demand through the meter.

When the meter shaft 53 is revolving at a speed slower than the differential gear 56 due to a demand through the meter less than 60 per cent of its full load, the register shaft 59 is driven in the opposite direction to drive the register 62 to indicate the slippage represented by the curve 51. As in the previous adaptations of the invention the registers 61 and 62 are geared to the shaft 59 by the no back gearing commonly used to connect registers of this kind.

Since the curve 51 is a complex curve the register 62 is somewhat different than the registers hereinbefore employed. In the preferred embodiment, the register 62 comprises a disc 63 which is rotated by the shaft 59 for a given interval of time and controlled by the mechanism 60 which is driven from the constant speed mechanism 20".

Arranged around the periphery of the disc 63 are a plurality of pins 64 spaced proportionately to the height of the curve 51 above the abscissa so that as the disc is revolved a number of pins proportionate to the demand are driven past a given point 65. The device 60 is timed to release the disc 63 from the shaft 59 at the expiration of each unit period of time which may be an hour, a half hour, or any other convenient unit. The unit of time must be sufficiently small so that when the disc is operating at its maximum speed, that is when the demand through the meter is practically zero, the disc will make less than a 360 degree revolution during the interval of time that it is connected to the shaft 59.

When the device 60 disconnects the disc 63 from the shaft 59, that disc is returned to its normal position by any preferred means such as a spring 60', and as the pins 64 pass the point 65 they operate a counter 66 which counts the number of pins that pass. This counter may be a mechanical counter of the well known Veeder type, or an electrical counter the circuit of which is completed through the pins 64 to cause it to operate once for each pin passing the point 65.

When the corrected amount of gas that has passed through the meter is to be computed, the reading of register 52 is noted, the reading of register 61 is noted and subtracted therefrom since the correction represented by the slippage 50 is negative, and the consumption registered on the register 62 is noted and added to the difference between the other two registers. The result thus obtained is an accurate computation of the total amount of gas that has passed through the meter.

In certain instances where the curve 51 is even more abrupt than that shown in Figure 6, I propose to modify the disc 63 in the manner shown in Figures 9 and 10. Instead of placing the pins 64 all around the periphery of the disc, I provide a plurality of rows of pins 70, 71 and 72 with a contactor 73 which may be either mechanical or electrical registering with one of these rows of pins at a time. The pins are spaced in the rows in accordance with the height of the slippage curve above the abscissæ at the demand at which the meter is operating at the moment, and the contactor is moved from row to row in accordance with the demand at the time that the device 60 releases the disc 74 from the shaft 59'. The arrangement for moving the contactor 73 is not of the essence of the present invention and any convenient arrangement may be used, such as, for example, the differential pressure arrangement shown in Figure 13 of the Patent 1,621,203, issued to C. R. Houghton, March 15, 1927. Further, the device 60 which releases the disc may be any suitable device such as are now in common use in demand meters and the like, as shown in the Patent 1,654,730 issued to F. C. Holtz January 3, 1928.

To move the contact 73 from row to row I may employ a manometer connected across the meter and operated upon the differential pressure thereacross, which differential pressure will be proportional to the demand upon the meter. By this arrangement, and with the choice of a suitable interval of time after the elapse of which the disc is returned to normal, the amount of gas that has slipped past the impellers of the meter can be very accurately registered since the pin can be positioned accurately according to the demand curve.

The multi-row disc 74 shown in Figures 9 and 10 may also be advantageously used to make corrections to compensate for the temperature or pressure variations of the gas, or both. The shaft 75 controlling the contactor 73 may be operated by a pressure or temperature variation responsive device to move the contactor 73 from one row of pins to another in accordance with the pressure and temperature at which the meter is operating. Arrangements for doing this are old, being shown in Figure 5 of the Houghton patent, supra. In this embodiment, each row of pins will have the pins spaced therein in accordance with the correction factor at that particular pressure and temperature. Then when the meter is operating at or near that temperature and pressure the contactor will engage the corresponding row of pins and will operate the register or meter counter to indicate a corrected amount for that temperature and pressure.

When the temperature and pressure at which the meter is operating varies sufficiently to introduce a sufficiently large error in such registration, the shaft 75 will be moved by the temperature pressure compensator to readjust the contact 73 to the proper row of pins, in a manner explained by Houghton, supra.

Throughout the foregoing, I have assumed that the registration of the corrections of the meter will be kept separate from the main registration of the meter. I deem it advisable to do this since it will be much easier to explain to the customer how the particular amount of the bill is arrived at if the two items are maintained separate. The main register registers the gas consumed and the amount shown by this register will comprise the major portion of the total amount of gas consumed, that amount frequently being as much as 90 per cent of the total quantity. The remaining 10 per cent is registered on the auxiliary register, and the fact that it is small and accurately registered is instrumental in convincing the customer that the charge for it is just and reasonable.

In the embodiment of the invention shown in Figures 5 and 7, if desired I can gear the main register to the meter shaft with little or no overdrive and cause the constant speed mechanisms 20' and 20" to register a value proportionate to the length of time that the meter was in service so that the charge can be still further broken up to thereby make its justification in the eyes of the customer easier when the necessity arises.

In other words, the constant speed mechanism 20' and 20" may be made to drive registers, such as registers 25 of Figure 3, and the reduction of overdrive in the main register, such as register 33 of Figure 5, will be compensated for by the registrations of the registers driven by the constant speed mechanism. Thus, in obtaining a totalized reading of the meter, the registrations of register 33, indicating the actual demand, as shown by the displacement meter 1, of register 36, indicating the slippage occurring from zero demand to say 10 per cent demand, of register 37, indicating the slippage occurring from 10 per cent demand to 100 per cent demand, and of the register driven by the constant speed mechanism, compensating for the reduction in overdrive upon the main register, and indicating slippage occurring during the period of time that the meter is in use, which corresponds to the constant unit leakage during this period as indicated by the area under line 35 of Figure 4, will be summed up for obtaining the total meter reading. The customer, therefore, is enabled to ascertain just which particular portion of his bill is due to each of these factors.

Throughout the specification I have referred to the meter as a gas meter, it being obvious that that reference be made for convenience sake only since the invention is applicable to all meters of the rotary displacement type, whether they are used for measuring gas, fluids, or any other material that could be made to pass through the meter.

Throughout the drawings I have illustrated the various devices diagrammatically only since the specific mechanical embodiment necessary to incorporate the invention in existing meters must be varied greatly to meet the particular conditions encountered, and I am not particularly concerned with those mechanical details in this invention but rather am concerned with the method of compensating for and registering the slippage of meters of this type.

The constant speed mechanisms 20, 20' and 20" may all be similar and may be operated in the manner described in connection with Figure 11, comprising geared registers driven either by direct rotation of the shaft 24 actuated by the magnetic clutch, or may be driven by a motor, such as motor 84, controlled by the clutch. Further, the clutch mechanisms 21, 21' and 21" may all be similar, and may operate in the same manner as described in connection with Figures 3 and 11.

I am not to be limited to the specific details disclosed since I am aware that there are many adaptations and modifications which must be made to meet particular conditions and which can be made by one skilled in the art within the teachings of my invention.

Having thus complied with the statutes and shown and described a preferred embodiment of my invention, what I consider new and desire to have protected by Letters Patent is pointed out in the appended claims.

What is claimed is:

1. In combination with a rotary displacement meter having a shaft which is revolved by the passage through the meter of the medium measured by the meter, a register operated by the rotation of that shaft to register the amount measured by the meter, a constant speed mechanism, a torque clutch for said mechanism connecting it to said shaft, a differential gearing comprising a gear mounted on said shaft and driven thereby, a gear driven by said constant speed mechanism, and a gear differentially driven by said first two gears, a shaft revolved by said latter gear, and means driven by said shaft for registering the slippage of said meter.

2. In combination with a rotary displacement meter having a shaft which is revolved by the passage through the meter of the medium measured by the meter, a register operated by the rotation of that shaft to register the amount measured by the meter, a constant speed mechanism, a torque clutch for said mechanism connecting it to said shaft, a differential gearing comprising a gear mounted on said shaft and driven thereby, a gear driven by said constant speed mechanism, and a gear differentially driven by said first two gears, a shaft revolved by said latter gear, and a pair of registers one of which is driven by a rotation of said second shaft in one direction to register one slippage of the meter and the other driven by a rotation of said second shaft in the opposite direction to register another slippage of the meter.

3. In combination with a rotary displacement meter having a shaft which is revolved by the passage through the meter of the medium measured by the meter, a register operated by the rotation of that shaft to register the amount measured by the meter, a constant speed mechanism, a graduated disc adapted to be controlled by said constant speed mechanism, a torque clutch for said mechanism connecting it to said shaft, a differential gearing comprising a gear mounted on said shaft and driven thereby, a gear driven by said constant speed mechanism, and a gear differentially driven by said first two gears, a shaft revolved by said latter gear, and a pair of registers one of which is driven by a rotation of said second shaft in one direction to register one slippage of the meter and the other driven by a rotation of said second shaft in the opposite direction through said graduated disc to register another slippage of the meter, said graduated disc containing pins spaced in accordance with the characteristics of the slip to be registered through it, which pins operate the register.

4. In a meter of the rotary displacement type, a register for registering the number of revolutions of the meter to thereby register the volume of fluid flowing through it, a torque clutch actuated by said meter, and a constant speed mechanism for driving a register and driven by said clutch only while said rotary meter is in motion to register the constant volume slippage of said meter as a function of time.

5. The combination with a gas meter of the rotary displacement type having a shaft revolved by gas flowing through the meter and having a slippage which can be resolved into a time proportional part and a speed proportional part, of a counter, a torque clutch actuated by rotation of said meter shaft, a mechanism adapted to be driven at a constant speed by actuation of said clutch only while the meter is in operation, said mechanism driving said counter to register that part of the slippage which is proportional to time, and a register over-driven by the shaft of the meter to register that part of the slippage which is proportional to the shaft speed.

6. The combination with a meter of the rotary displacement type whose slippage characteristic may be resolved into a simple function of the speed of its shaft above a critical speed and a complex function of the speed of the shaft below that critical speed, of a counter, means connected to the shaft and driven thereby to operate said counter to register accurately the displacement of the meter at that critical speed, a constant speed mechanism, a graduated disc adapted to be controlled by said constant speed mechanism, a torque clutch connecting said mechanism to said meter shaft, a register shaft, means for differentially driving said register shaft in forward and reverse directions responsive to meter speeds above and below said critical speed, respectively, comprising a gear mounted on said meter shaft and driven thereby, a gear driven by said constant speed mechanism, and a gear differentially driven by said first two gears and mounted on said register shaft, a register, said register operable to register the slippage of the meter which is a simple function of its speed and being driven by the forward movement of the register shaft, and a register for registering the complex function slippage of the meter driven by said register shaft and responsive to reverse movement of said register shaft, said graduated disc being interposed between said register shaft and said register and carrying means for operating said register from said register shaft through said disc.

7. In a meter of the rotary displacement type in which the slippage is directly proportional to the speed of rotation of the meter above and below a certain critical speed, a register, means for causing said meter to drive said register to register correctly its revolutions when it is operating at this critical speed, a constant speed mechanism, a clutch connection for actuating said mechanism only upon rotation of said meter, a register shaft, means for differentially driving said register shaft in one direction when the meter is revolving at a speed higher than said critical speed and in the opposite direction when the meter is revolving at a speed lower than said critical speed comprising a gear driven by said meter, a gear driven by said constant speed mechanism, and a gear differentially driven by said first two gears and mounted on said register shaft, and a pair of registers, one driven by the revolving of said register shaft when it is rotating in said one direction to register the slippage of the meter when it is operating above said critical speed, and the other driven by the revolving of said register shaft in the opposite direction to register the slippage when said meter is operating below said critical speed.

8. In a meter of the rotary displacement type, a register driven by said meter to register the number of revolutions it makes plus an additional amount equal to the portion of the slippage of the meter that is proportional to its speed, a second register, a constant speed mechanism for driving said second register, means for driving said mechanism only when said rotary meter is in operation to register the constant slippage due to operation of the meter, said constant speed mechanism being actuated by said driving means independently of the speed of said rotary meter.

9. The combination with a meter of the rotary displacement type having a slippage factor which may be divided into a portion directly proportional to the speed of rotation of the meter and a constant portion directly proportional to the time during which the meter is revolving, of a revolution counter over-driven by the meter in the same proportion as said first slippage, a second counter, and means for driving said second counter while the meter is revolving including a shaft rotatable only when said meter is revolving to register said constant portion of the slippage, said driving means rotating independently of the speed of said meter during operation of said meter.

10. In combination, a fluid conduit, a meter in said conduit actuated by flow of fluid therethrough, means for registering the actuation of said meter, and secondary registering means actuated by flow of fluid through said conduit as a function only of the duration of fluid flow.

11. In combination, a fluid conduit, a by-pass for said conduit, a meter in said conduit actuated only after a predetermined minimum flow has been established in said conduit, metering means in said by-pass, means for opening said by-pass to flows less than said minimum flow, means for registering the actuation of said conduit meter during all fluid flows above said minimum flow, and independent secondary registering means actuated only as a function of the duration of operation of said conduit meter.

12. In combination, a fluid conduit, a registering meter in said conduit actuated by fluid flow therethrough, a secondary mechanism actuated only during operation of said registering meter and independently of variations in fluid flow through said conduit, and means for registering the movement of said secondary mechanism.

EARL L. TORNQUIST.